(No Model.) 2 Sheets—Sheet 1.

W. BUTTERFIELD.
COMPRESSING AND TRIPPING DEVICE FOR AUTOMATIC SELF BINDERS.

No. 539,852. Patented May 28, 1895.

Witnesses
Arthur Johnson
Elise M. Halverson

Inventor.
William Butterfield (No Model.) 2 Sheets—Sheet 2.

W. BUTTERFIELD.
COMPRESSING AND TRIPPING DEVICE FOR AUTOMATIC SELF BINDERS.

No. 539,852. Patented May 28, 1895.

Witnesses.
Arthur Johnson
Elise M. Halverson

Inventor.
William Butterfield

THE NORRIS PETERS CO., PHOTO-LITHO., WASHINGTON, D. C.

UNITED STATES PATENT OFFICE.

WILLIAM BUTTERFIELD, OF CHICAGO, ILLINOIS.

COMPRESSING AND TRIPPING DEVICE FOR AUTOMATIC SELF-BINDERS.

SPECIFICATION forming part of Letters Patent No. 539,852, dated May 28, 1895.

Application filed April 4, 1892. Serial No. 427,768. (No model.)

*To all whom it may concern:*

Be it known that I, WILLIAM BUTTERFIELD, of Chicago, in the county of Cook and State of Illinois, have invented certain new and useful Improvements in Compressing and Tripping Devices for Automatic Self-Binders, of which the following is a full description, reference being had to the accompanying drawings, in which—

Figure 1:
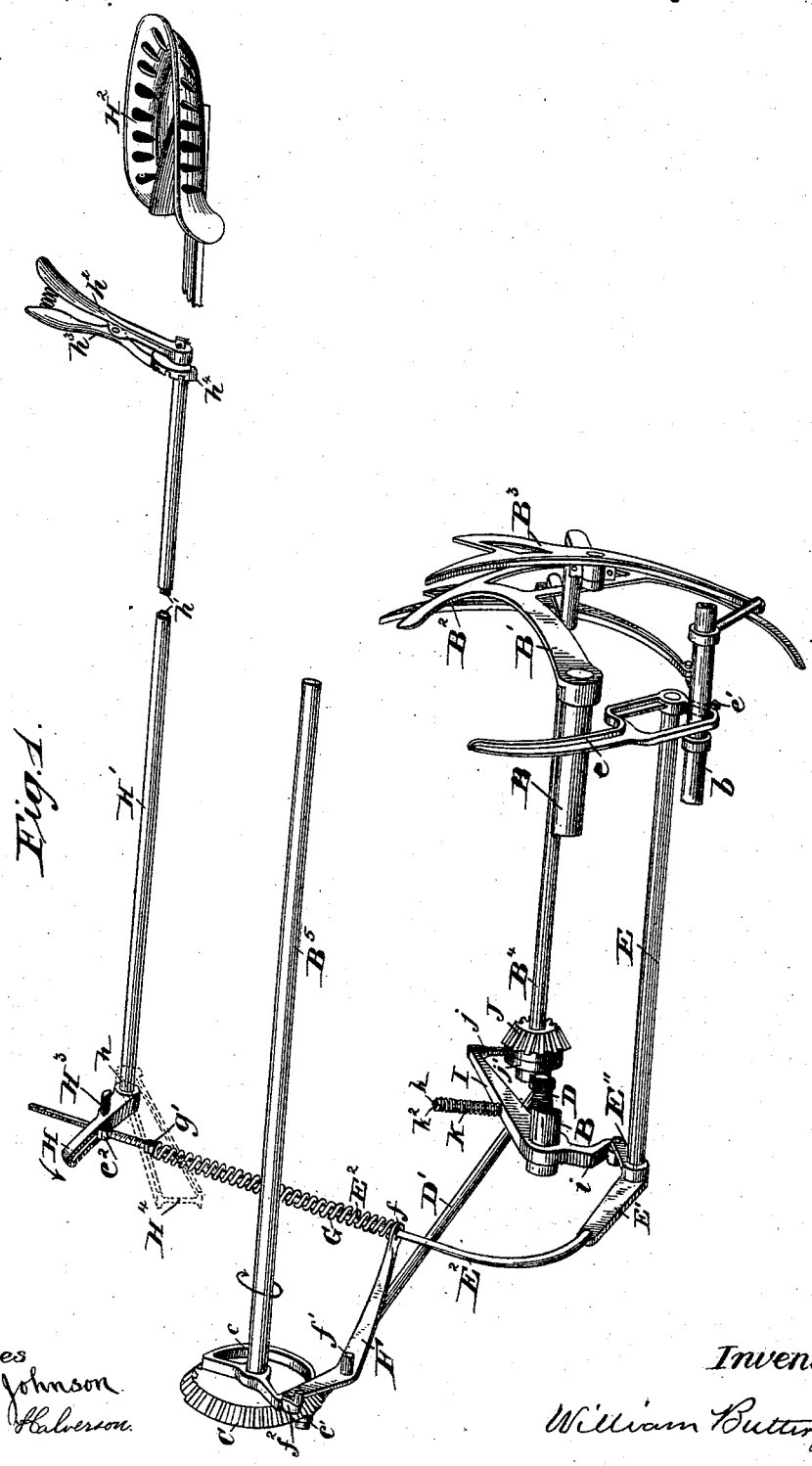
Figure 2:
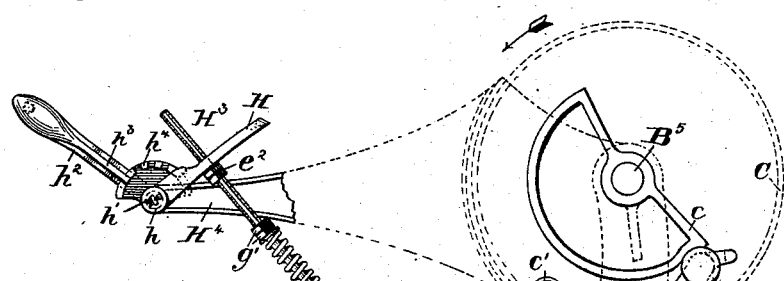
Figure 6:
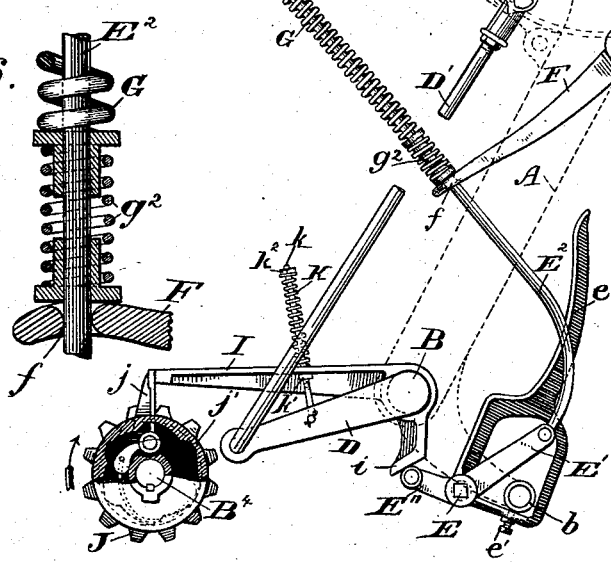

Figure 1 is a perspective view representing those parts of a self-binder necessary to be considered in connection with my invention. Fig. 2 is an end view of similar parts with a supplemental spring on the compressor spring-rod, however; and Figs. 3, 4, 5, and 6 are details.

The object of my invention is to provide means whereby the driver without stopping his machine may regulate the sensitiveness of the compressing devices and tripping devices. I am aware that tripping devices are so made that their sensitiveness may be regulated, but such has been done only by the use of a single spring, and that only by stopping the machine and leaving the seat. I am also aware that tripping devices have been made so that the operator might throw the clutching devices into engagement and bind a bundle as required, but I am not aware that machines have been made whereby the density of compaction, and consequent size of the bundle, in a measure, might be regulated from the driver's seat by any means, nor the density of compaction, for any purpose, regulated by the driver from his seat.

Another object of my invention is to provide means whereby the sensitiveness of the compressing and tripping devices may be regulated in a more expeditious manner than has heretofore been accomplished. This object is effected by using a supplementary spring that will act in opposition to the compressor spring or to the trip spring so that both may be influenced by the one adjustment of the said supplementary spring.

In Fig. 2, I have shown, in dotted lines, the main binder frame A. It is of the usual U-shaped form, but as it performs no other functions in connection with my invention than supports for various shafts and arms, I have, for the sake of clearness, omitted showing it in full.

B is the needle shaft of an ordinary Appleby binder, and B' the needle.

$B^2$ and $B^3$ are packers carried by cranks on the shaft $B^4$. The latter may be driven in any of the well known ways.

$B^5$ is the knotter shaft, properly supported in the binder frame and adapted to support the knotting devices at the end adjacent to the middle of the bundle, and operate them. At the other end, however, it carries the beveled gear wheel C, having the cam $c$ and a crank wrist $c'$.

The needle shaft has the crank D secured to it, and from the wrist of said crank to the wrist $c'$ is the pitman D'.

So far, is found no departure from machines now in use, and the parts are described only as far as necessary for a proper understanding of my improvements.

E is the tripping compressor shaft and $e$ the tripping compressor arm secured thereto and moved thereby to permit the escape of the completed bundle. The said shaft also serves as means for transmitting movement, produced by the gavel that is forming, to the tripping devices.

The packers are shown as linked to a support $b$. For convenience I so shape the arm $e$ that it will surround the support $b$, and the latter thus forms a stop to limit the movement of the compressor arm.

In order to set the compressor arm any desired distance away from the terminal position of the packers in their stroke, so as to, in effect, enlarge or reduce the binding receptacle, I provide the set screw $e'$ which, turned upward, draws the compressors away from the packers, and vice versa.

At the opposite end of the shaft E is the arm E', and connected in an eye thereof is the compressor rod $E^2$. This rod passes through a slot-shaped eye $f$ of the lever F, pivoted to the frame by means of the pin $f'$, and preferably carrying an anti-friction roller $f^2$, the latter adapted to roll along the cam-like arm $c$. It will be clearly understood that if the shaft $B^5$ be given a rotation indicated by the arrow the compressor will be held in an erected position in the ordinary manner until the cam-rim has moved so far that the anti-friction roller will drop toward the axis of the wheel and the compressor thus be permitted to fall and let the completed bundle pass over. Above the spring G are one or more nuts $g'$, by means of which the tension of the said spring may be set.

As, when in hard labor, binding devices choke because of a larger amount of straw between the needle as one element of the compressing device and the compressor arm as the other, it is desirable to adjust the tension of the compressor spring to adapt it to the conditions of grain. With a compressor spring very tense and a condition of grain that can be but little reduced by compression, the binder will be likely to choke. It is desirable to have the compression spring so tensely set that the machine will operate under the usual condition of grain and still be adjustable at the will of the attendant so that he may decrease the tension of the compressor spring when desired, or permit it to return to its normal degree of tension. To accomplish this result I provide means whereby pressure may be brought upon the spring that shall aid the compressor $e$ in overcoming the resistance due to the spring G. To make this clear,—let it be assumed that a gavel is between the needle and the compressor arm and being compressed. The compressor arm will be held only by the spring G, and before it can yield will have to overcome the stress of the latter. Through the instrumentality of the spring-held arm H, I press upon the spring rod with any desired degree of pressure. The arm H being spring-held and free to press upon the rod $E^2$, the pressure of said arm will be deducted from the tension of the spring G.

The specific means for carrying this improvement into effect is shown in Fig. 1, where the arm H is loosely pivoted on an axis $h$ and free to rock thereon. A spring is connected thereto, adapted to press and tend to move it in the direction indicated by the arrow in Fig. 1. I have seen fit to adapt a torsion spring $h'$ to this work, and make it from preference of a steel strap.

$H'$ is one of the fore and aft rails of the binder. In this case I make it hollow and allow the torsion spring, which it will be seen also serves as a rock shaft, to project from the end nearest the driver's seat $H^2$ and secure it there by means of a cotter to a lever $h^2$. This lever has a spring latch $h^3$, adapted to engage a quadrant $h^4$, firmly secured to the support $H'$. By means of the thumb latch and handle $h^2$ the rock shaft $h'$, which in this case also serves as a spring, may be influenced and the pressure of the arm H, on the rod be increased. I make the rock shaft $h'$ a torsion spring as shown in lieu of connecting the arm H to a non-elastic shaft by means of the spring. The seat spring is shown in the drawings broken away, merely for shortening the figure. The seat $H^2$ may be considered to be in any of the usual positions. In Fig. 2 the compressor spring is shown to be supplemented by a weaker spring $g^2$, but I wish to ignore the same when treating of my improvement as means for increasing or decreasing the tension of the compressor spring proper, and consider it as shown in Fig. 1, as one spring. As the compressor is allowed to drop, through the instrumentality of the cam-arm $c$ and lever F, the rod $E^2$ is permitted to draw through the spring arm H. Because of the positions of the axis $f'$ and the axis of the rock shaft E, the upper end of the rod $E^2$ does not move in a truly longitudinal direction, and hence I slot the opening in the spring arm H. In order that the latter arm may not fall out of position, I provide it with a stop $H^3$, which strikes the supporting arm $H^4$. In order to adapt the rod $E^2$ to be pressed upon by the arm H and still permit a portion of it to extend through the slot, I provide the adjustable stop $e^2$. The pressure of the spring upon the rod may, in a measure, be increased or decreased by adjusting these nuts.

As I wish to distinguish between the two purposes to which my device may be applied, I will here concisely restate the operation of the compressor. The spring G may be considered as properly set for binding grain that is not difficult to compress; but should the operator come to a part of the field in which the straw is difficult to compress, he moves the latch lever over in proper direction to increase the pressure of the arm H on the spring rod. Under such stress the spring G will more easily give way and less stress be applied to the compressor $e$. The further purpose of effecting the degree of tension of the spring when considered as a trip spring is accomplished by means so far omitted, in part, but which will now be explained. The arm $e$ is also a tripping arm, and in order that it may serve such purpose the movement imparted to it by the accumulating gavel is transmitted to a detent I. This detent I preferably pivot on the needle shaft, and extend an arm $i$ to a point within reach of the arm $E''$. Upon the arm $E''$ I mount an anti-friction roller, which may be considered to be simply an anti-friction termination of said arm.

I provide a clutch, consisting of the pinion J, having a spring pawl $j$, pivoted thereto and extending therefrom. $j'$ is a ratchet secured to the shaft $B^4$, which is supposed to be driven continuously. The construction of the clutch is sufficiently well shown in Fig. 2 for present purposes, and needs no description. Any equivalent form of clutch will serve the same purpose.

Figure 5:
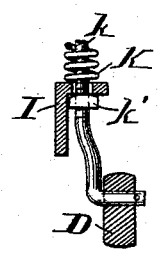
Figure 3:
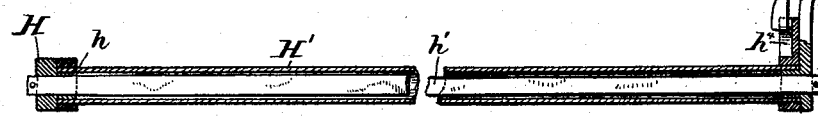
Figure 4:
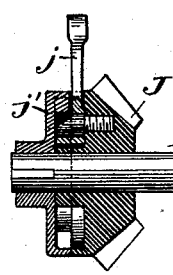

K is a spring adapted to hold the detent I, in proper position to disengage the pawl $j$ of the clutch when the latter strikes it. In order that the position of the detent relative to the pawl may be maintained when at rest, I thread the rod $k$ nearly its whole length, secure its lower end to the needle shaft crank, and provide the nut $k'$. To prevent the said nut from turning and getting out of place, I locate it within the angle formed by the flanges of the arm I, as shown in Fig. 5. By raising the detent upward on its axis this nut may be turned to any desired position.

Treating the arm $e$ as a tripping arm only, it will be seen that the spring G, either alone or supplemented by the spring $g^2$, is depended upon for holding it in an erected position, and that the arm F, through the spring, the rod $E^2$, arm $E'$ and shaft E, sustains it. The needle shaft, moving to its home position, carries the detent with it, and the spring K holds the said detent in proper position. The tension of the spring K may be set by means of the nut $k^2$, so as to exert a resistance such as required to effect the proper degree of compaction of difficult grain. The arm $e$ yields under pressure due to compaction. The lever $E''$ pressing upon the lever $i$ in an upward direction moves along the inclined portion and raises the detent, when the parts of the clutch are permitted to engage and the binding devices are driven through a revolution.

Now, assuming the machine to reach a place in the field where it is desired to bind bundles with less compaction or bind them more frequently than usual, the operator then makes the effective pressure of the trip spring K less, by increasing the pressure on the rod $E^2$, and thus helps the grain being compacted to move the tripping compressor $e$. If, in short, he wishes the effective pressure of the tripping spring reduced, he moves the lever over so as to give the arm H a greater amount of elastic pressure upon the rod $E^3$. It is not the intention to trip the binder by such movement and hence stops are provided which prevent the arm H from moving so far as to produce that result, as heretofore described.

I can no more easily explain the desirability of this device than by use of an expression common among operators of self-binders in the field in working in very difficult grain, namely, "open up the binder." Ordinarily they stop the machine and go and make an adjustment of the nut $k^2$ so that the binder may trip easily.

It may be desirable under some circumstances to so construct the machine that the tripping of the clutch will be adjustable in the matter of sensitiveness, independent of the spring G, in which case the said spring G may be supplemented by the lighter spring $g^2$, made of smaller wire. I locate upon the rod $E^2$ two sliding collars, as shown in section in Fig. 6, of such length that the spring may lie between the two flanges, and when compressed the latter touch each other so that none of the stress of compression will come on this spring. As a tripping device, the operation will be substantially the same whether the supplemental spring $g^2$ be used or not.

What I claim as my invention, and desire to secure by Letters Patent, is—

1. In a self-binder, a compressing arm, a spring connected to the said arm for yieldingly sustaining the same in its proper position for performing its office as a compressor, in combination with mechanism under the control of the attendant that exerts a continuous pressure upon the compressor in opposition to the pressure of the compressor spring whereby the degree of effective tension of the sustaining spring may be counteracted at will, substantially as described.

2. In a self-binder, the compressor arm suitably supported and adapted to rock on its support, a spring under the control of the attendant adapted to create pressure upon the compressor in opposition to the compressor spring by means of which the tension of the compressor spring proper may be in part neutralized, substantially as described.

3. The combination of the rocking compressor, the connection $E^2$ adapted by suitable mechanism to operate the same, a spring on said connection, and a spring presser H, adapted to press upon the said connection and exert an influence in opposition to the compressor spring, substantially as described.

4. In a self-binder, the connecting rod, a compressor spring thereon, and a stop thereon by the use of which the spring is made to move said rod, a supplemental spring adapted to operate upon the connecting rod and to force the said rod in a reverse direction by pushing thereon, all combined substantially as described.

5. The combination of the compressor arm, the compressor link $E^2$, the spring sustaining arm F, a spring connecting the said link and the said arm F, the latter controlled by a cam and suitably connected thereto, whereby the compressor is sustained, and yields elastically, and a supplemental spring adapted to press upon the said link and act in opposition to the compressor spring, said supplemental spring being controlled at will, substantially as described.

6. In a self-binder, the combination of the cam, the lever F, the spring rod $E^2$, the compressor $e$, said spring rod and said compressor suitably connected, whereby the one is moved by the other, and the supplemental elastically-held presser H, adapted to press upon the said spring rod and counteract the spring G, said supplemental presser adjustable at will, substantially as described.

7. In a self-binder, a spring-sustained compressor, in combination with the supplemental spring-held presser H, adapted to act upon said compressor and so arranged that the tension of the former may be modified by the latter, substantially as described.

8. In a self-binder, a spring-held tripping arm $e$, adapted to rock on its axis under the pressure of the accumulating gavel and set free the clutching devices that are normally prevented from engaging, a supplemental spring operating upon said arm in opposition to the said trip spring and adapted to counteract the tension of the trip spring and in part neutralize the stress of the latter, substantially as described.

9. In a self-binder, a clutch detent, a spring adapted to hold said detent in position until the latter is forced to yield away from the clutching devices by the tripping arm, a supplemental spring, the stress of which is adjustable at will, adapted to press upon the clutch detent in opposition to the detent spring and counteract the tension of the said detent spring, substantially as described.

10. In a self-binder, a clutch detent suitably connected to a tripping arm, whereby it is moved from contact with the clutching devices, said detent spring-held, an elastically-held presser arm H, operating upon the said detent in opposition to the detent spring whereby its pressure may neutralize the tension of the detent spring, all combined substantially as described.

11. In a self-binder, the tripping arm, spring-held clutch detent, and clutch, all suitably connected, in combination with a spring adjustable in its tension by the attendant from his seat, adapted to operate upon the clutch detent in opposition to the said detent spring and counteract the detent spring to any degree desired, substantially as described.

12. In combination with a tripping and compressing mechanism of a self-binder, a spring adapted to operate upon the clutch detent and compressor and counteract the compressor spring and the detent spring to any degree desired, substantially as described.

13. In combination with the compressing device and the clutching and clutch tripping devices of a self-binder, the arm H, spring $h'$, and adjusting lever adjacent to the driver's seat, the said arm H adapted to operate upon the clutch detent and compressor in opposition to the detent and compressor springs substantially as described.

14. In combination with the clutching devices, the tripping devices and compressing devices of a self-binder, all suitably connected and operated substantially as described, the stop $e^2$ the slotted arm H, connected to the said compressing and tripping devices by pressing upon the said stop the spring rock shaft $h'$ and the adjustment lever, substantially as described.

15. In combination with the compressing, tripping and clutching devices of a self-binder, connected and operated substantially as described, a spring presser adapted to act in opposition to the compressor spring, the said spring presser adapted to operate upon the clutch detent and compressor and having a stop to limit its movement in the direction which its pressing spring would tend to move it to follow the compressing spring, substantially as described.

WILLIAM BUTTERFIELD.

Witnesses:
ARTHUR JOHNSON,
ELISE M. HALVERSON.